United States Patent
Kageyama

(10) Patent No.: US 10,139,589 B2
(45) Date of Patent: Nov. 27, 2018

(54) ZOOM LENS UNIT AND INDICATOR MEMBER

(71) Applicant: Nittoh Inc., Suwa-shi, Nagano (JP)

(72) Inventor: Takuya Kageyama, Nagano (JP)

(73) Assignee: Nittoh Inc. (JE)

( * ) Notice: Subject to any disclaimer, the term of this patent is extended or adjusted under 35 U.S.C. 154(b) by 0 days.

(21) Appl. No.: 15/353,357

(22) Filed: Nov. 16, 2016

(65) Prior Publication Data

US 2017/0059813 A1    Mar. 2, 2017

Related U.S. Application Data

(63) Continuation of application No. PCT/JP2015/061412, filed on Apr. 14, 2015.

(30) Foreign Application Priority Data

May 21, 2014    (JP) .................. 2014-105378

(51) Int. Cl.
| | | |
|---|---|---|
| G02B 7/10 | (2006.01) | |
| G03B 17/14 | (2006.01) | |
| G03B 17/18 | (2006.01) | |

(52) U.S. Cl.
CPC ............. *G02B 7/102* (2013.01); *G02B 7/10* (2013.01); *G03B 17/14* (2013.01); *G03B 17/18* (2013.01); *G03B 2205/0046* (2013.01)

(58) Field of Classification Search
CPC . G02B 7/102; H02K 1/12; H02K 3/28; H02K 41/00; H02K 41/0356

USPC .................................... 359/696, 701
See application file for complete search history.

(56) References Cited

U.S. PATENT DOCUMENTS

| | | | | | |
|---|---|---|---|---|---|
| 4,506,959 | A | * | 3/1985 | Hama | G02B 7/105 359/706 |
| 5,654,789 | A | * | 8/1997 | Kirigaya | G02B 7/102 396/529 |

FOREIGN PATENT DOCUMENTS

| | | |
|---|---|---|
| JP | 2005-128374 A | 5/2005 |
| JP | 2007-298672 A | 11/2007 |

OTHER PUBLICATIONS

International Search Report (in Japanese) regarding Application No. PCT/JP2015/061412 transmitted dated Jul. 14, 2015 (8 pages).

* cited by examiner

*Primary Examiner* — James Greece
(74) *Attorney, Agent, or Firm* — Harness, Dickey & Pierce, P.L.C.

(57) ABSTRACT

A zoom lens unit includes a zoom ring that has a scale indicating a focal length of the zoom lens unit, an indicator member that points a desired value on the scale, and a selection mechanism that is configured to select one of first and second moving states of the indicator member. In the first moving state, the indicator member moves as the zoom ring rotates. Further, in the second moving state, the indicator member moves without rotating the zoom ring.

8 Claims, 5 Drawing Sheets

ZOOM LENS UNIT AND INDICATOR MEMBER

CROSS-REFERENCE TO RELATED APPLICATION

This application is a continuation of PCT Application No. PCT/JP2015/061412 filed Apr. 14, 2015 which claims priority to Japanese Patent Application No. 2014-105378 filed May 21, 2014 which are hereby expressly incorporated by reference herein in their entireties.

BACKGROUND

The present invention relates to a zoom lens unit and an indicator member.

A zoom lens unit that is provided with a zoom ring having a scale showing a focal length is known. The focal length is changed according to a rotation amount of the zoom lens unit when a user performs a rotation (zoom) operation on the zoom lens unit. See, for example, Japanese Patent Publication No. 2007-298672.

In the zoom lens unit explained above, it is common that the focal length is continuously (steplessly) changed by the rotation of the zoom ring. Therefore, it is difficult that after the focal length between lines of the scale is adjusted once, the same focal length is reproduced later.

SUMMARY

The present invention attempts to solve the problems explained above. An object of the present invention is to provide a zoom lens unit and an indicator member that make it easy reproduce a focal length that was once adjusted.

To achieve the above object, a zoom lens unit according to one aspect of the present invention includes: a zoom ring that has a scale indicating a focal length of the zoom lens unit; an indicator member that points a desired value on the scale; and a selection mechanism that is configured to select one of first and second moving states of the indicator member. In the first moving state, the indicator member moves as the zoom ring rotates. Further, in the second moving state, the indicator member moves without rotating the zoom ring.

In the zoom lens unit according to the above aspect of the present invention, the zoom ring is configured with first and second half ring members. The first and second half ring members are attachable to each other to configure the zoom ring in a ring shape.

In the zoom lens unit according to the above aspect of the present invention, the selection mechanism includes an energization member. The energization member is located between the zoom ring and the indicator member so as to energize the zoom ring and the indicator member. When the zoom ring and the indicator member are energized by the energization member, a relative location of the zoom ring and the indicator member is fixed so that the indicator member moves as the zoom ring rotates in the first moving state.

An indicator member according to another aspect of the present invention, which points a desired value on a scale indicating a focal length attached to a zoom ring, the indicator member includes: a selection mechanism that is configured to select one of first and second moving states of the indicator member. In the first moving state, the indicator member moves as the zoom ring rotates. Further, in the second moving state, the indicator member moves without rotating the zoom ring.

In the indicator member according to the above aspect of the present invention, the zoom ring is configured with first and second half ring members. The first and second half ring members are attachable to each other to configure the zoom ring in a ring shape.

In the indicator member according to the above aspect of the present invention, the selection mechanism includes an energization member which energizes the zoom ring. When the zoom ring is energized by the energization member, a relative location of the zoom ring and the indicator member is fixed so that the indicator member moves as the zoom ring rotates in the first moving state.

The present invention can provide a zoom lens unit that can make it easy to reproduce a focal length that was once adjusted, and an indicator member.

BRIEF DESCRIPTION OF THE DRAWINGS

FIG. 6 shows a part that corresponds to a configuration shown in FIG. 4 of the zoom lens unit according to the embodiment of the present invention.

DESCRIPTION OF EXEMPLARY EMBODIMENTS

A configuration and an operation of a zoom lens unit and an indicator member according to an embodiment of the present invention.

Figure 1:
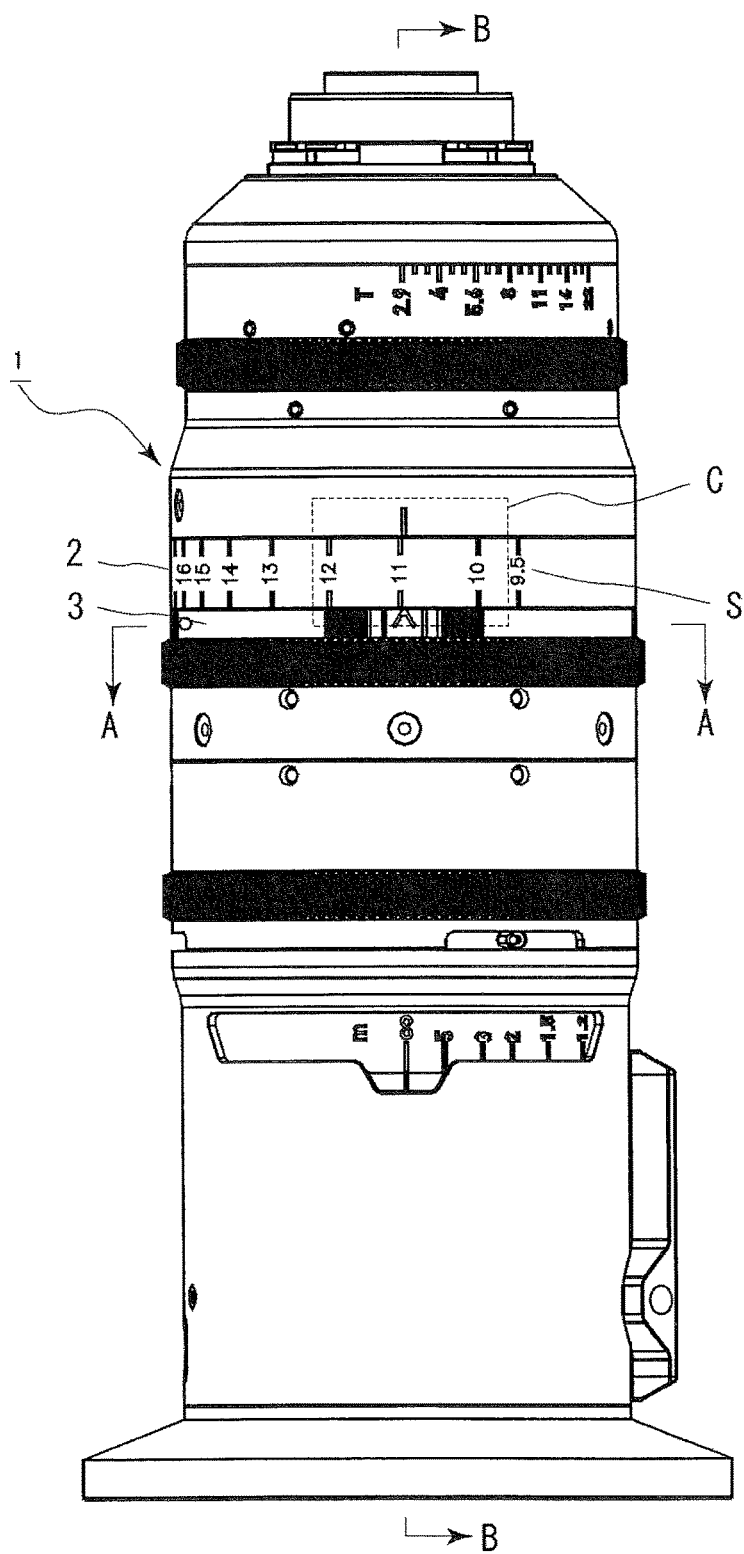
FIG. 1 is a front view that shows a zoom lens unit according to an embodiment of the present invention.
Figure 2:
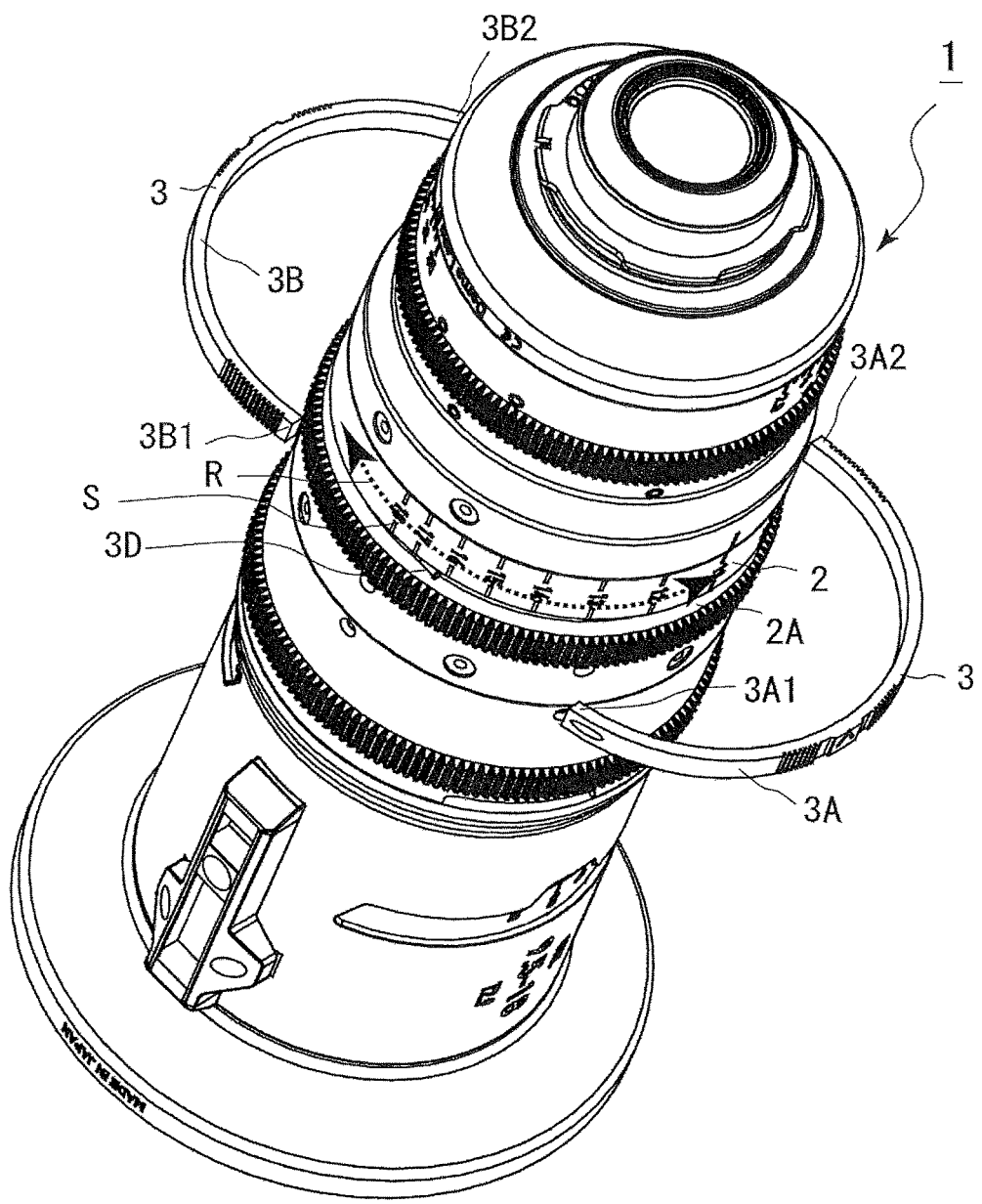
FIG. 2 is an exploded perspective view that shows an indicator member, which is disassembled, of the zoom lens unit according to the embodiment of the present invention when viewed from rear and right side surface sides of the zoom lens unit shown in FIG. 1.

As discussed below, a zoom lens unit and an indicator member according to an embodiment of the present invention will be explained with reference to the drawings. FIG. 1 a front view that shows the zoom lens unit according to the embodiment of the present invention. FIG. 2 is an exploded perspective view that shows the indicator member, which is disassembled, of the zoom lens unit according to the embodiment of the present invention when viewed from rear and right side surface sides of the zoom lens unit shown in FIG. 1.

A zoom lens unit 1 has an annular zoom ring 2 having a scale S that shows a focal length. Specifically, the focal length is changed is changed according to a rotation amount of the zoom lens unit 1 when a user performs a rotation (zoom) operation on the zoom lens unit 1 (a direction indicated by the arrow R in FIG. 2 and the rotation of a circumferential direction of the zoom lens unit 1). Further, the zoom lens unit 1 has an annular indicator member 3 that indicates a desired value (any value) on the scale S.

As shown in FIG. 2, ends 3A1 and 3A2 of a disassembled indicator member 3A that is one part of the indicator member 3 are respectively fixed to ends 3B1 and 3B2 of a disassembled indicator member 3B that is the other part of the indicator member 3 by screws 3D. Specifically, the end 3A1 of the disassembled indicator member 3A is fixed to the end 3B1 of the disassembled indicator member 3B. Further, the end 3A2 of the disassembled indicator member 3A is fixed to the end 3B2 of the disassembled indicator member 3B. As a result, it becomes the annular indicator member 3 shown in FIGS. 1 and 3. Further, an orientation of letters (numbers) on the scale S shown in FIG. 2 is opposite to that on the scale S shown in FIG. 1. This is because FIG. 2 is the diagram of the zoom lens unit when viewed from the rear side, FIG. 2 shows the diagram in which the scale S of the zoom lens unit 1 shown in FIG. 1 (the front view) is not seen in a view angle in FIG. 2. In the same manner, the scale S shown in FIG. 2 is not seen in FIG. 1. Because the scale S respectively shown in FIGS. 1 and 2 is provided on the same zoom ring 2, the same reference characters "S" are used for Labeling.

Figure 3:
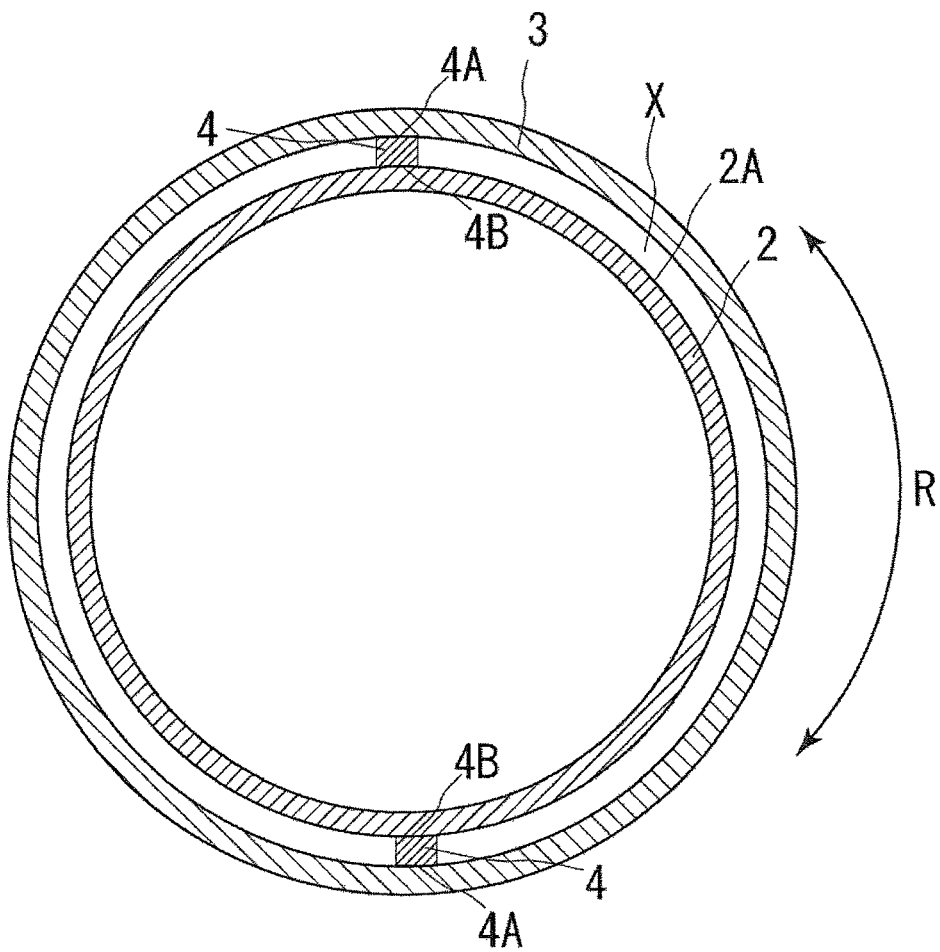
FIG. 3 is an A-A cross-sectional schematic view of the zoom lens unit shown in FIG. 1 and shows only a zoom ring, the indicator member and a coil spring according to the embodiment of the present invention.
Figure 4:
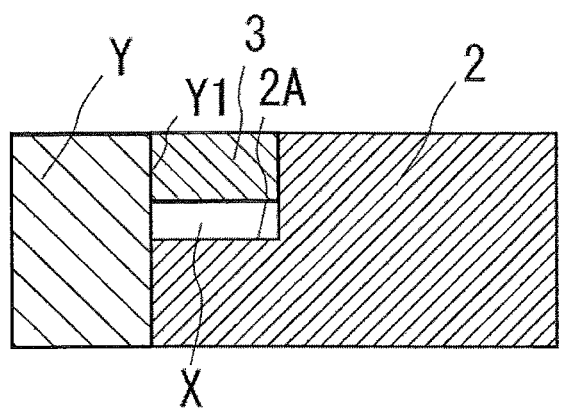
FIG. 4 is a B-B cross-sectional schematic view of the zoom lens unit shown in FIG. 1 and shows only a set of the zoom ring and the indicator member according to the embodiment of the present invention.

FIG. 3 is an A-A cross-sectional schematic view of the zoom lens unit 1 shown in FIG. 1 and shows only the zoom ring 2, the indicator member 3 and a coil spring 4 explained below. FIG. 4 is a B-B cross-sectional schematic view of the zoom lens unit 1 shown in FIG. 1 and shows only a set of the zoom ring 2 and the indicator member 3.

The indicator member 3 is formed in the zoom ring 2 and is fitted into a groove 2A that is provided in a circumferential direction of the zoom lens unit 1 shown in FIG. 1. In this case, it could be said that it is not appropriate to express the groove 2A as "groove" based on only the sectional shape of the zoom ring 2 shown in FIG. 4. However, a section height dimension of a member Y that is located adjacent to the zoom ring 2 shown in FIG. 4 is the same as a section height dimension (a greatest value) of the zoom ring 2. Therefore, a smaller part (the groove 2A) of the sectional height dimensions compared to the sectional height dimension (the greatest value) of the zoom ring 2 is expressed as "groove" by looking along with a wall Y1 of the member Y.

The coil springs 4 that correspond to an energization member are interposed at two locations between the indicator member 3 and the zoom ring 2 at upper and lower portions as shown in FIG. 3. One end 4A of the coil spring 4 is attached so as to be fixed to a side of the indicator member 3. The other end 4B that is located at an opposite side of the one end 4A of the coil spring 4 has a spherical member (not shown) that contacts the groove 2A and at the same time, is slidable with respect to the groove 2A. Each of the coil springs 4 is fixed to a center in a length direction of each of the disassembled indicator members 3A and 3B shown in FIG. 2.

Further, the coil spring 4 is compressed between the indicator member 3 and the groove 2A so that the coil spring 4 energizes both the indicator member 3 and the zoom ring 2. Due to this energizing force of the coil spring 4, a relative position of the indicator member 3 and the zoom ring 2 is fixed. Further, the reason why there is a gap X between the groove 2A and the indicator member 3 in FIGS. 3 and 4 is because the gap X is required for having the coil spring 4 and the spherical member (not shown) between the groove 2A and the indicator member 3.

In a state in which the relative position of the indicator member 3 and the zoom ring 2 is fixed, when the zoom rig 2 rotates along the arrow R, the indicator member 3 also rotates with the rotation of the zoom ring 2. Further, it is also possible that while the zoom ring 2 is fixed so as not to rotate along the arrow R, the indicator member 3 can also rotate along the arrow R independently with respect to the zoom ring 2. When the indicator member 3 rotates along the arrow R independently with respect to the zoom ring 2, the spherical member explained above slides with respect to the zoom ring 2.

In other words, a user who uses the zoom lens unit 1 can select one of moving states of the indicator member 3 explained above, i.e., (1) the rotation with the rotation of the zoom ring 2 and (2) the rotation without the rotation of the room ring 2. Further, the energizing force of the coil spring 4 makes it possible to perform the rotation of the moving state (1).

Figure 5A:
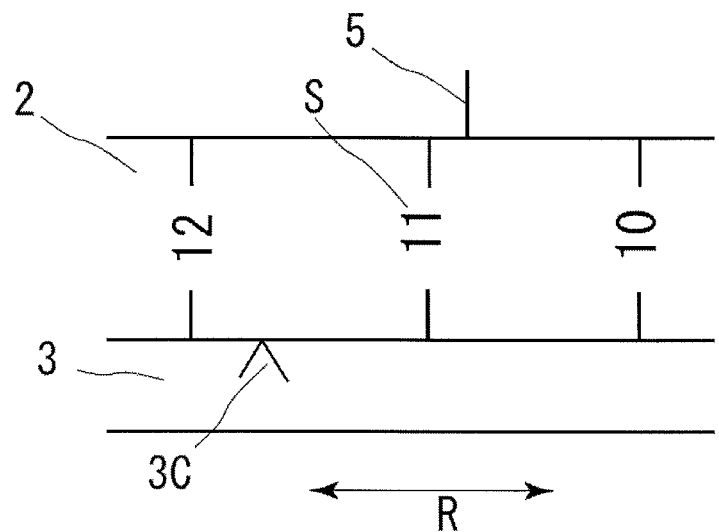
FIGS. 5A and 5B are schematic views of a region C of the zoom lens unit shown in FIG. 1 according to the embodiment of the present invention.
Figure 5B:
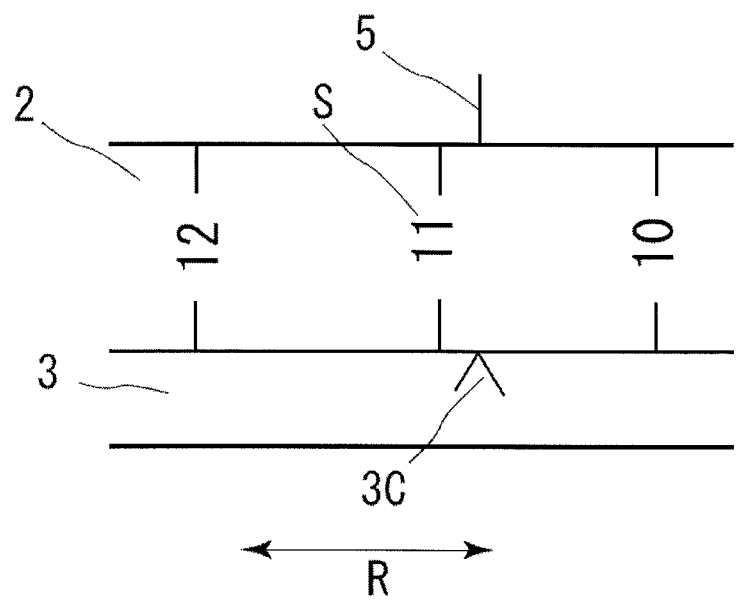

FIGS. 5A and 5B are schematic views of a region C of the zoom lens unit 1 shown in FIG. 1. When the user performs a rotation (zoom) operation on the zoom ring 2 along the arrow R by the user, the focal length is changed according to the rotation amount. FIG. 5A shows a state in which the focal length that the user is satisfied with is determined. In the above state, an index line 5 (a fixed line of which a position is not changed even by rotating the zoom ring 2) indicates a point located between the value "10" and the value "11" of the scale S. While the user fixes the zoom ring 2 in the above state so as not to be rotated, only the indicator member 3 is rotated along the direction of the arrow R so as to make a position of an indicator 3C of the indicator member 3 be aligned to the position of the index line (FIG. 5B). Thereafter, the relative position of the indicator member 3 and the zoom ring 2 remains as a fixed state by the energizing force of the coil spring 4. As a result, although the user rotates the zoom ring 2 so as to adjust another focal length that is different from the focal length being previously set (satisfied), it is possible to easily reproduce the previous focal length with which the user is satisfied by aligning the position of the indicator 3C to the position of the index line 5 again as shown in FIG. 5B.

Main Effects that are Obtained by the Embodiment of the Present Invention

As explained above, the zoom lens unit 1 according to the embodiment of the present invention can easily reproduce the focal length that is adjusted in the past. Similarly, at the time of using the zoom lens unit 1, the indicator member 3 according to the embodiment of the present invention can also easily reproduce the focal length that is adjusted in the past.

Further, the spherical member (not shown), which contacts the groove 2A and at the same time, is slidable with respect to the groove 2A, is attached to the other end 4B of the coil spring 4. Because the spherical member is used, the sliding between the other end 4B and the groove 2A is performed very smoothly, and operability for the user can be great.

Further, the indicator member 3 is fitted into the groove 2A that the zoom ring 2 has and that is formed in the circumferential direction of the zoom lens unit 1. Therefore, when the other end 4B of the coil spring 4 and the groove 2A are slid while contacting, because the groove 2A becomes a guide of the indicator member 3, a positional misalignment hardly occurs.

Other Embodiment

The zoom lens unit 1 and the indicator member 3 according to the embodiments of the present invention explained above are an example of the ideal embodiment of the present invention. Therefore, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, the spherical member (not shown), which contacts the groove 2A and at the same time, is slidable with respect to the groove 2A, is attached to the other end 4B of the coil spring 4. However, because the spherical member is not an essential member, it can be omitted. Further, it is also possible that a plate member instead of the spherical member is fixed to the other end 4B of the coil spring 4 so as to contact the groove 2A and at the same time, to be slidable with respect to the groove 2A by such as a plate surface of the plate member.

Further, because the coil spring 4 that corresponds to the energization member is also not an essential member, it can also be omitted. Further, the energization member, such as the coil spring 4, is attached so as to make the one end 4A of the coil spring 4 be fixed to the zoom ring 2. In addition, the other end 4B of the coil spring 4 can also contact and at the same time, be slidable with respect to the indicator member 3. Also, the energization member is not limited to the coil spring 4, and can also be such as a plate spring.

The zoom lens unit 1 has the index line 5. However, because the index line 5 is not an essential component, it is also possible not to be provided. It is also possible to reproduce the focal length that is adjusted in the past by aligning the position of the indicator 3C of the indicator member 3 to a portion of the other members of the zoom lens unit 1 instead of the index line 5.

Further, the indicator member 3 has a configuration of being disassembled into the disassembled indicator members 3A and 3B. However, instead of adopting this configuration explained above, it is also possible to make the indicator member 3 by configuring and assembling with three or more pieces of disassembled indicator members, or by configuring with a single ring-shaped member. Each of the coil springs 4 is fixed to the center in the length direction of each of the disassembled indicator members 3A and 3B. However, the number of fixing locations of the coil springs 4 or an arrangement position can be set appropriately.

Further, as shown in FIGS. 3 and 4, the coil spring 4 energizes the zoom ring 2 and the indicator member 3 in a radial direction of the zoom lens unit 1 shown in FIG. 1. However, the energization member, such as the coil spring 4, can also energize the zoom ring 2 and the indicator member in different directions other than the above radial direction.

Figure 6:
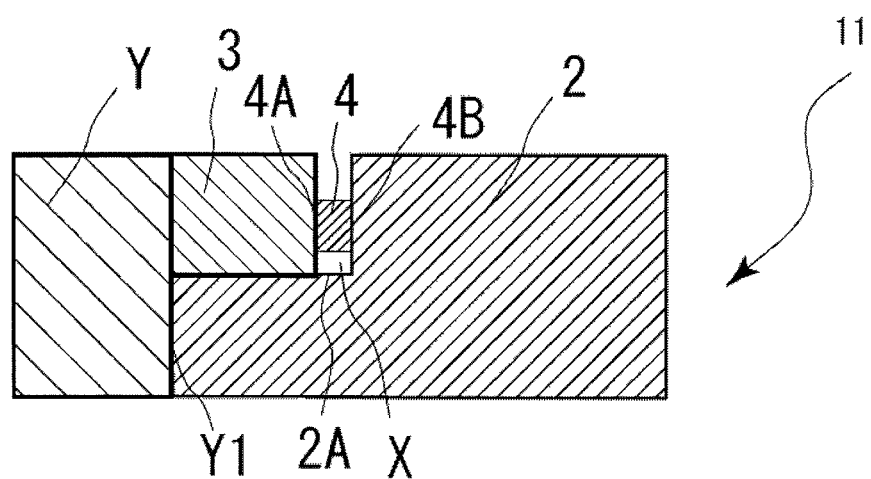
FIG. 6 is a diagram that shows a variation of the zoom lens unit according to the embodiment of the present invention.

For instance, FIG. 6 is a diagram that shows a variation of the zoom lens unit 1 according to the embodiment of the present invention and that shows a part that corresponds to the zoom lens unit 1 shown in FIG. 4. Here, a zoom lens unit 11 according to the variation of the zoom lens unit 1 according to the embodiment of the present invention energizes the zoom ring 2 and the indicator member 3 in a length direction (a vertical direction in FIG. 1).

In FIG. 6, in regards to the zoom lens unit 11, the same reference numerals in the zoom lens unit 1 are used for labeling for the same constituting members as the zoom lens unit 1. Thus, the redundant explanations with respect to the common constituting members between the zoom lens unit 1 and the zoom lens unit 11 are omitted.

In FIG. 6, the coil spring 4 is interposed between the zoom ring 2 and the indicator member 3 in the length direction of (the vertical direction or an up down direction in FIG. 1) of the zoom lens unit 11 so as to energize them. Therefore, there is no gap X between the groove 2A and the indicator member 3. The gap X exists between the zoom ring 2 and the indicator member 3 in the length direction of the zoom lens unit 11.

In the same way as the zoom lens unit 1, the indicator member 3 of the zoom lens unit 11 can also perform both (1) the rotation with the rotation of the zoom ring 2 and (2) the rotation without the rotation of the room ring 2 by the user's selection. Thus, it is also the same as the zoom lens unit 1 that the energizing force of the coil spring 4 makes it possible to perform the rotation of the above (1).

Further, the indicator member 3 is fitted into the groove 2A that the zoom ring 2 has and is formed in the circumferential direction of the zoom lens unit 1. However, because this groove 2A is not an essential component of the zoom lens unit 1, it is also possible not to be provided. Further, though the groove 2A is configured by combining the zoom ring 2 with the member Y in the embodiment of the present invention, it is also possible to provide the same groove as the groove 2A by the zoom ring 2 as a single entity. In addition, also in regards to the groove 2A of the zoom lens unit 11, it is also possible to provide the same groove as the groove 2A by the zoom ring 2 as a single entity.

What is claimed is:

1. A zoom lens unit comprising:
   a zoom ring that has a scale indicating a focal length of the zoom lens unit, the zoom ring having a zoom ring inner surface and a zoom ring outer surface opposite to each other, the zoom ring inner surface being located closer to an optical axis of the zoom lens unit than the zoom ring outer surface, the zoom ring having a cut-out that is concave from the zoom ring outer surface toward the zoom ring inner surface;
   an indicator ring that is disposed in the cut-out of the zoom ring, the indicator ring having an indicator ring inner surface and an indicator ring outer surface opposite to each other, the indicator ring having an indicator that is configured to point a desired value on the scale; and
   a spring that is disposed in the cut-out between first part of the zoom ring and the indicator ring inner surface,
   wherein when a spring force is applied between the first part of the zoom ring and the indicator ring inner surface, a relative location between the zoom ring and the indicator ring is fixed so that the indicator ring and the zoom ring are configured to rotate together, and
   when the zoom ring maintains at a current location so as to prevent the zoom ring from rotating with respect to the zoom lens unit, the indicator ring is configured to rotate relative to the zoom ring.

2. The zoom lens unit according to claim 1,
   wherein the indicator ring is configured with first and second half ring members, and
   the first and second half ring members are attachable to each other to configure the indicator ring in a ring shape.

3. The zoom lens unit according to claim 1,
   wherein the zoom ring outer surface and the indicator ring outer surface are located on a same plane.

4. The zoom lens unit according to claim 3,
   wherein the same plane extends along the optical axis.

5. An indicator member that is attachable to a zoom lens unit having a zoom ring, the zoom ring including:
   a scale indicating a focal length of the zoom lens unit;

a zoom ring inner surface and a zoom ring outer surface opposite to each other, the zoom ring inner surface being located closer to an optical axis of the zoom lens unit than the zoom ring outer surface; and a cut-out that is concave from the zoom ring outer surface toward the zoom ring inner surface, the indicator member comprising:

an indicator ring that is disposed in the cut-out of the zoom ring when the indicator member is attached to the zoom lens unit, the indicator ring having:
  an indicator ring inner surface;
  an indicator ring outer surface opposite to the indicator ring inner surface; and
  an indicator that is configured to point a desired value on the scale; and a spring that is disposed in the cut-out between first part of the zoom ring and the indicator ring inner surface when the indicator member is attached to the zoom lens unit, wherein when the indicator member is attached to the zoom lens unit and when a spring force is applied between the first part of the zoom ring and the indicator ring inner surface, a relative location between the zoom ring and the indicator ring is fixed so that the indicator ring and the zoom ring are configured to rotate together, and when the indicator member is attached to the zoom lens unit and when the zoom ring maintains at a current location so as to prevent the zoom ring from rotating with respect to the zoom lens unit, the indicator ring is configured to rotate relative to the zoom ring.

6. The indicator member according to claim 5,
wherein the indicator ring is configured with first and second half ring members, and
wherein the first and second half ring members are attachable to each other to configure the indicator ring in a ring shape.

7. The indicator member according to claim 5,
wherein the zoom ring outer surface and the indicator ring outer surface are located on a same plane when the indicator member is attached to the zoom lens unit.

8. The indicator member according to claim 7,
wherein the same plane extends along the optical axis.

* * * * *